United States Patent [19]
Crosswell et al.

[11] 3,810,672
[45] May 14, 1974

[54] CARGO DEFLECTOR PANEL

[75] Inventors: Flay D. Crosswell; Gerald W. Galbreath, both of Marion, Ohio

[73] Assignee: Overhead Door Corporation, Marion, Ohio

[22] Filed: Sept. 27, 1972

[21] Appl. No.: 292,626

[52] U.S. Cl. ............................ 296/106, 160/209
[51] Int. Cl. .............................................. B62d 25/06
[58] Field of Search ...... 296/106, 51; 160/213, 209, 160/201; 105/378

[56] References Cited
UNITED STATES PATENTS
2,217,437 10/1940 Ferris et al. ..................... 160/209

Primary Examiner—Philip Goodman
Assistant Examiner—John A. Carroll
Attorney, Agent, or Firm—Woodhams, Blanchard & Flynn

[57] ABSTRACT

A conventional truck trailer is provided with a sectional door which is rollingly supported in substantially L-shaped tracks mounted on the sidewall of the trailer. The door is movable from a closed vertical position wherein it is disposed in vertical track portions, to an open horizontal position wherein it is supported on horizontal track portions disposed adjacent the top wall of the trailer. The present invention provides a false ceiling extending between the side walls of the trailer and disposed directly below the horizontal track portions, which false ceiling extends to a point adjacent to but spaced from the door when same is in its closed position. A substantially rectangular deflector panel, in the preferred embodiment, has one edge thereof pivotally connected to the top panel of the door, with the other edge thereof being rollingly supported on the guide tracks. The deflector panel is disposed at an angle relative to the door when same is in its closed position, whereby said other edge is positioned adjacent the end of said false ceiling. The deflector panel and false ceiling prevent the cargo from entering into the space between the tracks when the door is closed.

17 Claims, 7 Drawing Figures

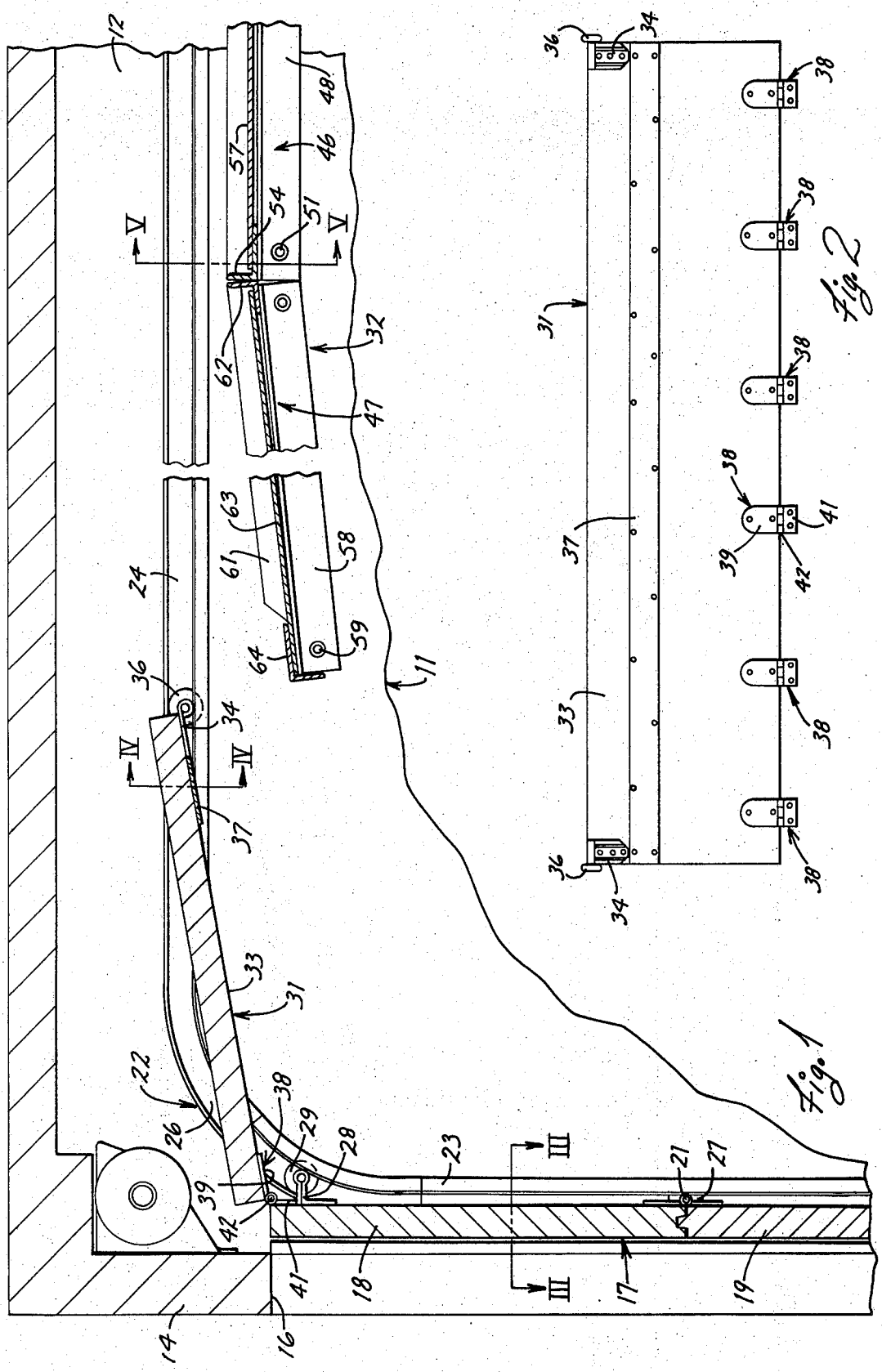

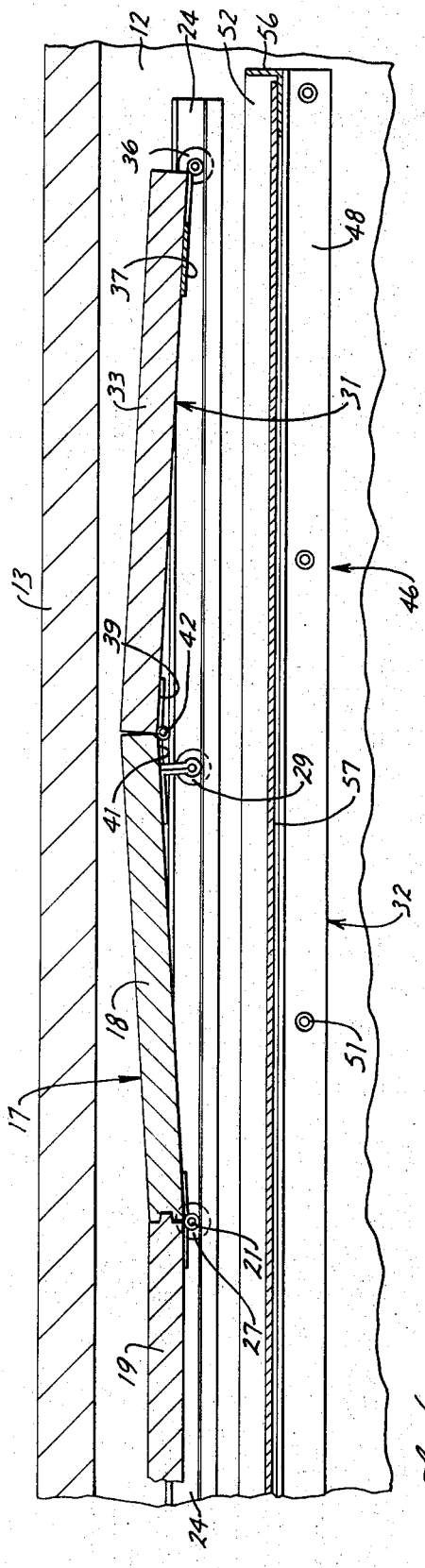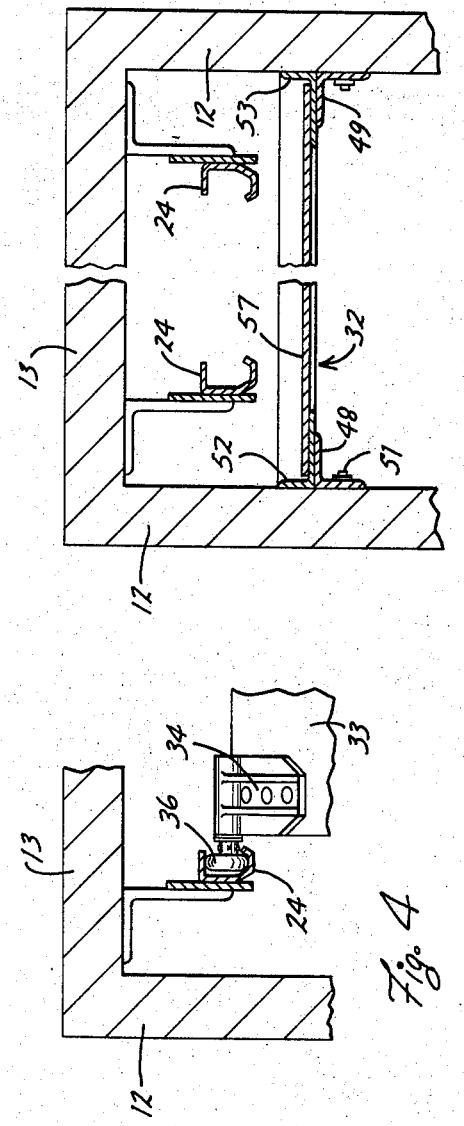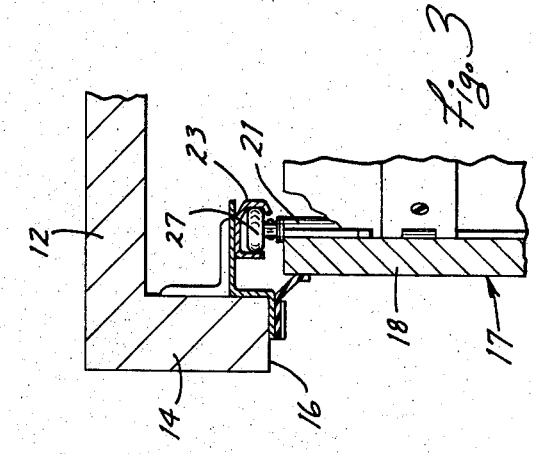

CARGO DEFLECTOR PANEL

FIELD OF THE INVENTION

This invention relates to a vehicle body such as a truck trailer having a conventional sectional door movable between a closed vertical position and an open horizontal position and, in particular, to a deflector system associated with the door and the horizontal portions of the guide tracks for preventing the cargo disposed within the trailer from being accidentally positioned whereby it would interfere with the free opening movement of the door.

BACKGROUND OF THE INVENTION

This invention relates to a deflector system adapted to be mounted in a truck trailer having a conventional sectional cargo door rollingly supported upon substantially L-shaped tracks. The door, when in an opened position, is supported on horizontal track portions which extend into the interior of the trailer adjacent the top wall thereof.

One of the problems which has long existed with truck trailers of this type has been the difficulty encountered in opening the door when the load or cargo contained within the trailer has shifted. Particularly, when a trailer is filled with boxes or the like, the transporting of the trailer often results in shifting of one or more of the boxes, so that some of the boxes become positioned within the space between the horizontal tracks which extend into the rear of the trailer adjacent the top wall thereof. Accordingly, when an attempt is made to open the rear door, the boxes disposed between the horizontal track portions prevent the door from being moved into its fully open position. Further, it has been observed that when this problem is encountered, the truck terminals often utilize a lift truck to lift against the bottom panel of the door to forcibly open same. This often results in breakage of the door rollers, distortion of the track, breakage of the door hinges, and the like.

It is an object of the present invention to provide a deflector system designed for association with the door of a truck trailer for preventing the cargo or load from shifting into a position wherein it prevents the door from being moved to its open overhead position. Accordingly, it is an object of the present invention to provide:

1. A deflector system, as aforesaid, which includes a deflector panel which extends across the width of the truck trailer and is pivotally supported adjacent the upper portion of the door opening, whereby the deflector panel extends upwardly and inwardly relative to the trailer when the door is in its closed position to prevent the cargo from being positioned where it will engage the upper edge of the door as same is moved into its open position.

2. A deflector system, as aforesaid, wherein the deflector panel has the one edge thereof pivotally connected to an upper portion of the door, with the opposite edge of the deflector panel being rollingly supported on the horizontal portions of the guide tracks.

3. A deflector system, as aforesaid, wherein a false ceiling extends between the trailer sidewalls and is disposed directly below the horizontal track portions, which false ceiling prevents cargo from being moved upwardly into the space between the horizontal track portions.

4. A deflector system, as aforesaid, wherein the false ceiling extends rearwardly of the truck trailer to a point spaced forwardly of the door when same is closed, with said false ceiling terminating at a location closely adjacent the upper free edge of the deflector panel when the door is closed.

5. A deflector system, as aforesaid, wherein the deflector panel is pivotally connected to the top section of the door.

6. A deflector system, as aforesaid, wherein the deflector panel extends at an angle relative to the door and relative to the vertical when the door is in its closed vertical position so that movement of the door to its open position causes the deflector panel to be moved upwardly relative to the cargo to permit free opening movement of the door even though the cargo may have shifted into engagement with the deflector panel when the door is in its closed position.

7. A deflector system, as aforesaid, which can be readily and economically attached to conventional trailers having conventional sectional doors associated therewith.

8. A deflector system, as aforesaid, which is economical to manufacture and install, and which is substantially free of maintenance.

Other objects and purposes of the present invention will be apparent to persons acquainted with devices of this type upon reading the following specification and inspecting the accompanying drawings.

BRIEF DESCRIPTION OF THE DRAWINGS

FIG. 1 is a broken elevational view taken partially in cross section and illustrating the rearward end of a truck trailer, same being provided with a deflector system according to the present invention associated with the sectional door.

FIG. 2 is a plan view taken on a reduced scale and illustrating the deflector panel constructed according to the present invention.

FIG. 3 is a fragmentary sectional view taken substantially along the line III—III of FIG. 1.

FIG. 4 is a fragmentary sectional view taken along the line IV—IV of FIG. 1.

FIG. 5 is a fragmentary sectional view taken along the line V—V of FIG. 1.

FIG. 6 is a fragmentary elevational view taken in cross section and illustrating the door in its open horizontal position.

Figure 7:
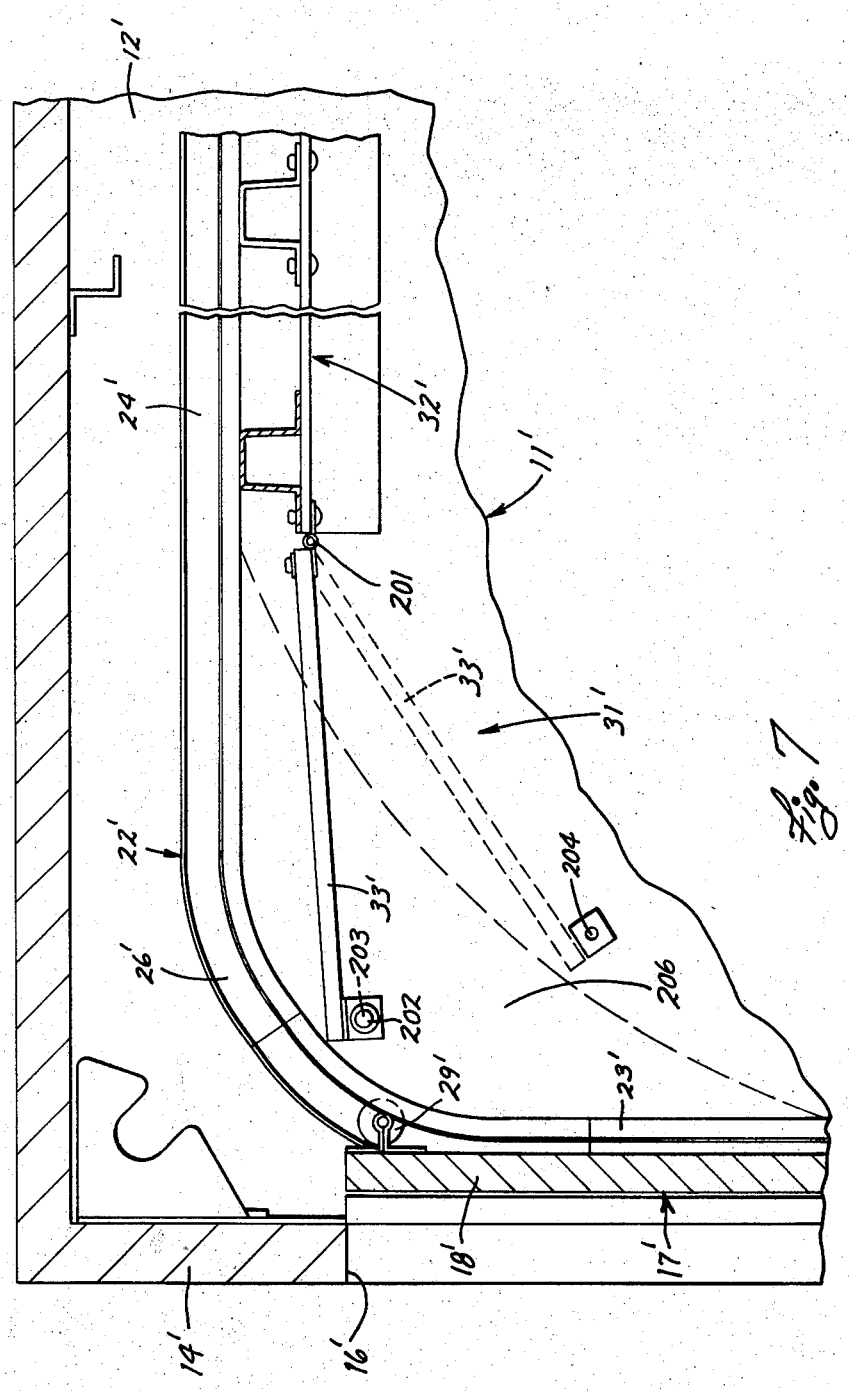
FIG. 7 is a view similar to FIG. 1 and illustrating a modified deflector system.

Certain terminology will be used in the following description for convenience in reference only. For example, the words "rightwardly" and "leftwardly" will refer to directions in the drawings to which reference is made. The word "front" will refer to the exterior surface of the door, same being the left side as appearing in FIG. 1, whereas the word "rear" will refer to the interior surface of the door, same being viewed from the right side of FIG. 1. The words "inwardly" and "outwardly" will refer to directions toward and away from, respectively, the geometric center of the system and designated parts thereof. Said terminology will include the words above specifically mentioned, derivatives thereof and words of similar import.

SUMMARY OF THE INVENTION

In general, the objects and purposes of the present invention are met by providing a substantially rectangular deflector panel having a width substantially equal to the width of the door. The deflector panel, in the preferred embodiment, has the lower edge thereof pivotally connected to the upper portion of the door, with the other edge of the deflector panel being provided with rollers thereon which are rollably supported on the door guide tracks. The deflector panel preferably extends at a substantial angle relative to the door when same is in its closed position so that the rollers provided on the upper edge of the door are maintained within the horizontal track portions, even when the door is closed. A false ceiling is mounted within the trailer directly below the horizontally extending track portions, which false ceiling extends throughout the length of the horizontal track portions but terminates at a location close to but spaced inwardly from the inner surface of the door when same is in its closed position. The upper edge of the deflector panel, when the door is closed, is preferably disposed closely adjacent the terminal edge of said false ceiling, whereby movement of the door to its open position causes the deflector panel and the door to enter into the space between the false ceiling and the top wall of the trailer.

DETAILED DESCRIPTION

FIG. 1 illustrates therein a portion of a conventional truck trailer 11 which includes opposed sidewalls 12 (FIG. 5) interconnected by a top wall 13 and having a rear wall 14 containing a conventional door opening 16 therein. A movable door 17 is disposed for closing the opening 16 in a conventional manner. The door 17 is preferably of the sectional type and includes a plurality of panels or sections hingedly connected together in a conventional manner. In the illustrated embodiment, the door 17 includes a top panel 18 interconnected to an intermediate panel 19 by a conventional hinge mechanism 21.

The door 17 is rollingly supported on a pair of conventional L-shaped tracks 22 which are secured adjacent the opposite sidewalls 12. Each track 22 includes a vertical track portion 23 disposed adjacent the door opening 16, a horizontal track portion 24 extending into the interior of the truck and positioned adjacent the top wall 13, and an arcuate track portion 26 extending between and interconnecting the vertical and horizontal track portion 23 and 24, respectively.

The guide tracks 22 for the door 17 are of substantially channel-shaped cross section, with the opposite guide tracks opening toward one another to receive therein rollers which are supported on the door adjacent the opposite edges thereof. The door 17, as illustrated in the drawings, includes a first pair of rollers 27 disposed adjacent the opposite edges of the door, which rollers are rotatably supported by the hinge assemblies 21 which pivotally interconnect the door panels 18 and 19. The uppermost or top door panel 18 is also provided with a pair of brackets 28 on the inner surface thereof adjacent the opposite upper corners of the panel, which brackets 28 in turn rotatably support thereon a pair of further guide rollers 29. The door is additionally provided with further coacting pairs of rollers located at the hinges which interconnect the remaining door panels, with a further pair of rollers being provided adjacent the lower edge of the lowermost door panel. This structure is conventional and has not been illustrated in the drawings. All of the rollers as supported on the door 17, including the rollers 27 and 29, are rollingly supported and confined within the channel-shaped guide tracks 22 whereby the door is thus movable from a closed vertical position, as illustrated in FIG. 1, to an open horizontal position wherein it is disposed closely adjacent the top wall of the trailer, substantially as illustrated in FIG. 6. However, it should be noted that the axis of the rollers 29 as associated with the upper edge of the top panel 18 is spaced rearwardly of the door by a distance greater than the spacing of the axis of the rollers 27 from the rear surface of the door, whereby the uppermost rollers 29 are thus disposed in the lower part of the arcuate track portions 26 when the door is in its closed position as illustrated in FIG. 1.

The structure of the door 17 and of the guide tracks 22 associated therewith, as briefly described, is conventional and thus further description of same is not believed necessary.

The present invention relates to a deflector system disposed for association with the door 17 and the guide tracks 22 for preventing the cargo or load as contained within the trailer 11 from interfering with the movement of the door 17 between its open and closed positions. For this purpose, the deflector system of the present invention includes a deflector means 31 which is associated with the door 17 for movement therewith, and a false ceiling 32 which is stationarily mounted on the trailer 11 directly below the top wall 13.

Considering first the deflector means 31, same includes a substantially rectangular deflector panel 33 having a width approximately equal to the width of the door 17. A pair of mounting brackets 34 are fixedly secured to the deflector panel 33 adjacent the upper corners thereof, which brackets 34 rotatably support thereon guide rollers 36. The rollers 36 are disposed within the horizontal track portion 24 for movement therealong. The deflector panel 33 also has a plate-like stiffening gusset 37 fixedly secured thereto and extending transversely thereacross adjacent the upper edge of the panel.

The lower edge of the deflector panel 33 is provided with a plurality of hinge assemblies 38 for permitting the deflector panel 33 to be pivotally connected to the upper portion of the door 17, the panel 33 being specifically and preferably connected to the upper door panel 18. Each hinge assembly 38 includes a pair of hinge leaves 39 and 41 interconnected by a conventional hinge pin 42. The hinge leaves 39 are fixedly secured to the deflector panel 33, whereas the hinge leaves 41 are fixedly connected to the upper door panel 18.

The false ceiling 32, as illustrated in FIGS. 1, 5 and 6, includes a main ceiling section 46 disposed directly beneath and substantially parallel with the horizontal track portions 24, and a rear ceiling section 47 (FIG. 1) disposed between the door 17 and the main ceiling section 46. The rear ceiling section 47, as it extends toward the door 17, is inclined downwardly so as to diverge relative to the horizontal track portions 24. The free end of the rear ceiling section 47, namely the leftward end in FIG. 1, is disposed in the vicinity of the junction between the horizontal track section 24 and the arcuate track section 26, whereby the free end of the rear ceiling section 47 is thus spaced a substantial distance from the inside surface of the door 17 when same is in its closed position.

To support the false ceiling within the interior of the truck trailer, there is provided a pair of support angles 48 and 49 (FIG. 5) fixedly secured to the opposite sidewalls 12 of the trailer. The support angles 48 and 49 are fixed to the sidewalls 12 by any conventional means, such as screws 51. The support angles 48 and 49 are disposed directly below and substantially parallel to the horizontal track portions 24 and support thereon a substantially rectangular frame which includes a pair of opposed side members 52 and 53 fixedly connected by a pair of end members 54 and 56. The rectangular frame defined by the members 52, 53, 54 and 56 supports therein a rectangular partition 57 which effectively functions as a false ceiling.

The rear ceiling section 47 is of similar construction and also includes a pair of support angles 58 fixedly secured to the opposed sidewalls 12 by means of screws 59. However, the support angles 58, as illustrated in FIG. 1, diverge relative to the horizontal track portion 22 as they extend rearwardly of the trailer toward the door opening 16. The rear ceiling section 47 also includes a substantially rectangular frame supported on the support angles 58, which rectangular frame includes a pair of opposed side members 61 interconnected by end members 62 and 64. The frame defined by the side members 61 and the end members 62 and 64 also supports therein a substantially rectangular partition 63 which also functions as a false ceiling. The end member 64, as illustrated in FIG. 1, comprises an angle which has its horizontal flange disposed on top of the partition 63, with the vertical flange of the end member 64 extending downwardly over the free edge of the partition 63 to thus protect same and to provide for increased clearance over the end members 64 to facilitate movement of the door 17 and of the deflector panel 33 between open and closed positions.

The partitions 57 and 63 are preferably provided with a grate-like construction, as by being of expanded metal, such as aluminum.

The deflector panel 33, when the door 17 is in its closed position as illustrated in FIG. 1, preferably extends at a substantial angle relative to the door so that the panel extends upwardly and inwardly relative to the trailer whereby the upper edge of the deflector panel 33, as supported by the rollers 36, is thus disposed in the horizontal track portion 24 substantially directly above the rearward edge of the false ceiling 31, as defined by the end member 64. Movement of the door 17 into its open overhead position thus results in an upward swinging movement of the panel 33 (clockwise in FIG. 1) about the axis of the guide rollers 36 simultaneous with the horizontal movement of the rollers 36 (rightwardly in FIG. 1) along the horizontal track portions 24, whereby the deflector panel is thus not subject to being wedged tightly against the contents or load contained within the interior of the trailer 11.

OPERATION

The operation of the deflector assembly according to the present invention, and its relationship to the conventional structure, will be briefly described below to insure a complete understanding thereof.

Assuming that the door is in its closed vertical position as illustrated in FIG. 1, then the deflector panel 33 will be disposed so as to extend at a substantial angle relative to the door, whereupon the upper edge of the deflector panel is thus positioned substantially directly over the free edge of the false ceiling 32. The guide rollers 36 as provided on the upper edge of the deflector panel 33 are thus maintained in rolling engagement with the horizontal track portion 24. The deflector panel 33 thus prevents the cargo from becoming lodged or wedged against the upper edge of the door 17. Since the upper edge of the deflector panel 33 is disposed substantially directly over the free edge of the false ceiling 32, this also prevents the cargo from becoming wedged against the upper edge of the deflector panel 33. Thus, if any shifting of the cargo should occur during transporting of the trailer, the cargo will be able to contact only the inside surface of the door 17 or the lower inner surface of the deflector panel 33. However, since the door sections are initially movable primarily in a vertical direction when the door is being moved to its open position, any cargo contacting same will not be effective in restricting or preventing the door from being opened. Likewise, since the deflector panel 33 pivotally swings upwardly (clockwise in FIG. 1) about the axis of the rollers 36 as the door is moved into its open position, this movement results in the deflector panel being moved away from any cargo which may have contacted the inner surface thereof, whereby the deflector panel 33 is also freely movable into its open position.

The structure of the present invention, namely the use of the movable deflector means 31 and the stationary false ceiling 32, thus insures that the cargo cannot be inadvertently shifted during transporting of same into a location where it will block the opening movement of the door 17. This thus greatly simplifies and facilitates the opening of the door 17, and likewise prevents the door and its associated hardware from being damaged due to a forcible opening of same when the door is jammed.

MODIFICATION

FIG. 7 illustrates therein the modified deflector system for use with a truck trailer. Since the truck trailer and deflector system illustrated in FIG. 7 incorporate therein structure which is similar to the structure illustrated in FIGS. 1 through 6, the parts of FIG. 7 will be identified by use of the same reference numeral used to identify the corresponding parts of FIGS. 1 through 6 but with a prime (') added thereto.

The deflector system 31' of FIG. 7 again includes a false ceiling 32' which is stationarily mounted on the trailer 11' directly below the top wall 13' thereof. The deflector system 31' also includes a substantially rectangular deflector panel 33' which is disposed in the region between the terminal edge of the false ceiling 32' and the inner surface of the sectional door 17' when same is in its closed position.

The deflector panel 33' has one edge therein (the rightward edge in FIG. 7) pivotally connected by means of a hinge assembly 201 to the rearward or terminal edge of the false ceiling 32'. The rearward edge of the panel 33' is in turn provided with spring loaded latches 202 adjacent the opposite side edges thereof, which latches are adapted to be disposed in resilient engagement with suitable catch devices mounted on the sidewalls of the trailer. For this purpose, the opposite sidewalls of the trailer are each provided with a first catch device 203 mounted thereon, which catch device engages the latching devices for holding the panel 33' in an uppermost loading position as illustrated by solid lines in FIG. 7. The opposed sidewalls are each further provided with a second catch device 204 mounted thereon at an elevation substantially below the first catch device 203, whereby the panel 33' can be pivotally swung downwardly about the hinge 201 so as to be latched into a lowermost position as illustrated by dotted lines in FIG. 7.

With the panel 33' in its unloading position, as illustrated by solid lines in FIG. 7, the door 17' can be freely moved between its open and closed positions inasmuch as the panel 33' does not extend between the guide tracks and thus does not interfere with the movement of the door. Further, in this position, the panel is at an elevation so as to permit cargo to be easily loaded into or unloaded from the trailer.

On the other hand, when the panel 33' is in its lowermost or transporting position, as illustrated by dotted lines in FIG. 7, the panel is disposed so as to substantially enclose the arcuate region 206 as defined under the arcuate portions 26' of the guide tracks. The goods or cargo contained in the trailer can thus not be accidently located in the region between the guide tracks so as to interfere with the opening of the door. Further, since the lower edge of the panel 33' when in the dotted position of FIG. 7 is disposed at an elevation substantially below the upper edge of the door (when the door is in its closed position), the panel thus prevents the cargo from being inadvertently shifted so as to contact the inside surface of the upper portion of the door. The cargo thus cannot interfere with the free opening of the door. Further, since the panel 33' is swung substantially vertically upwardly when being moved from its dotted line to its solid line position of FIG. 7, the panel can be easily moved into its unloading position even though the cargo may have become wedged against the lower surface of the panel.

With respect to the type of catch and latch devices utilized, any suitable structure can be utilized for this purpose. For example, the latch devices can consist of spring-urged pins slidably mounted on the panel, which pins are adapted to extend in catch devices in the form of recesses formed in the sidewalls of the trailer. This structure is disclosed merely for purposes of illustration inasmuch as any other conventional structure could be utilized.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a truck trailer having a pair of substantially vertical sidewalls and top and bottom walls connected between said sidewalls, the rear of said trailer defining an access opening into the interior thereof, a pair of substantially L-shaped guide tracks mounted on the walls of said trailer, said guide tracks including substantially vertical track portions disposed adjacent the opposite sides of said access opening and substantially horizontal track portions extending inwardly into the interior of said trailer adjacent the upper edge of said access opening, said vertical and horizontal track portions being interconnected by arcuate track portions, and a door unit slidably supported on said guide tracks and movable between a closed vertical position wherein said door unit is disposed within said vertical track portions for closing said access opening and an open substantially horizontal position wherein said door unit is supported on said horizontal track portions for uncovering said access opening, said door unit including a plurality of door panels horizontally hinged together to permit relative pivotal movement therebetween as the door unit moves between its open and closed positions, the improvement comprising:

deflector means associated with said door unit for preventing the cargo contained within said trailer from interfering with the upper edge of said door unit as same is being moved from its closed to its open position, said deflector means including a deflector panel extending laterally across the width of said door unit, said deflector panel being disposed at an angle relative to said door unit when same is in said closed position, one edge of said deflector panel being disposed adjacent the door unit and means pivotally connecting said one edge of said deflector panel to the upper portion of said door unit, the other edge of said deflector panel being disposed adjacent said horizontal track portions, and means associated with said deflector panel adjacent said other edge for slidably supporting same on said horizontal track portions.

2. A trailer according to claim 1, wherein said one edge of said deflector panel is pivotally connected to the uppermost panel of said door unit.

3. A trailer according to claim 1, wherein the plane of said deflector panel extends upwardly and inwardly relative to the plane defined by said door unit when same is in said closed vertical position.

4. A trailer according to claim 1, further including false ceiling means extending between said sidewalls at an elevation directly below said horizontal track portions, the rearward end of said false ceiling means terminating at a predetermined distance from the inner surface of said door unit when same is in said closed vertical position, said other edge of said deflector panel being disposed above and in the vicinity of the rearward edge of said false ceiling means when said door unit is in said closed vertical position.

5. A trailer according to claim 4, wherein said one edge of said deflector panel is pivotally connected to the uppermost panel of said door unit.

6. In a vehicle body having an access opening therein and a movable door associated with said access opening for closing same, said door being movable from a closed substantially vertical position wherein the door closes said access opening and an open substantially horizontal position wherein said door is disposed substantially horizontally within the interior of said body at an elevation adjacent the upper edge of said access opening, the improvement comprising:

partition means associated with said body for preventing the cargo disposed within the interior of said body from blocking the movement of said door from its closed to its open position, said partition means being inclined at an angle relative to a plane defined by said door when said door is in its closed vertical position, said partition means having a substantial depth with one edge thereof being disposed closely adjacent the inside surface of said door when same is in its closed vertical position, the opposite edge of said partition means being horizontally spaced a substantial distance from the inside surface of said door, said partition means also extending transversely across the width of said body and having a width at least approximately equal to the width of said door, said partition means extending inwardly into the interior of said body from a location adjacent the upper edge of said access opening.

7. A vehicle body according to claim 6, wherein said partition means includes a partition member positioned adjacent the inside surface of said door and means mounting said partition member for substantially vertical swinging movement relative to said body, said partition member extending inwardly into the interior of said body away from said access opening.

8. A vehicle body according to claim 7, wherein said partition means includes a further panel member fixedly connected to and extending between the sidewalls of said body at an elevation closely adjacent but slightly below the elevation of said door unit when same is in its open horizontal position, said further panel member being spaced inwardly in the interior of said body a substantial distance from said access opening, said first-mentioned panel member being disposed in the space between said further panel member and said access opening at least when said door is in said closed vertical position.

9. In a truck trailer having wall means defining an access opening into the interior thereof, a pair of substantially L-shaped guide tracks mounted on the wall means, said guide tracks including substantially vertical track portions disposed adjacent the opposite sides of said access opening and substantially horizontal track portions extending inwardly into the interior of said trailer adjacent the upper edge of said access opening, said vertical and horizontal track portions being interconnected by arcuate track portions, and a door unit slidably supported on said guide tracks and movable between a closed vertical position wherein said door unit is disposed within said vertical track portions for closing said access opening and an open substantially horizontal position wherein said door unit is supported on said horizontal track portions for uncovering said access opening, said door unit including a plurality of door panels horizontally hinged together to permit relative pivotal movement therebetween as the door unit moves between its open and closed positions, the improvement comprising:

partition means disposed within the interior of said trailer in the vicinity of the upper edge of said access opening for preventing the cargo located within the interior of said trailer from blocking movement of said door unit from its closed position to its open position;

said partition means including a first movable partition member having a width at least approximately equal to the width of said door and means mounting said first partition member in the vicinity of the upper edge of said access opening when said door unit is in said closed vertical position, said first partition member extending at a substantial angle relative to a vertical plane defined by said access opening; and said partition means including a second partition member having a width at least approximately equal to the width of said door unit and means fixedly mounting said second partition member relative to said wall means at an elevation closely adjacent but directly below the horizontal track portions, said second partition member being spaced inwardly within said trailer a substantial distance from said access opening.

10. A trailer according to claim 9, wherein said means supporting said first partition member permits same to vertically swing relative to the wall means of said trailer.

11. A trailer according to claim 10, wherein said first partition member is disposed at least partially below said arcuate track portions for at least partially isolating the space defined within and between said arcuate track portions from the cargo located within the interior of the trailer.

12. A trailer according to claim 9, wherein said first partition member has one edge thereof pivotally connected to an upper portion of said door unit, the other edge of said first partition member being pivotally and slidably supported on said horizontal track portions.

13. A body comprising walls defining an enclosure and providing an access opening into the interior of the enclosure, guide means disposed adjacent the access opening of the body and extending inwardly from the access opening into the interior of the enclosure, a door disposed for sliding engagement with the guide means for movement between closed and opened positions, said door when in said closed position totally closing said access opening, and deflector means for shielding the upper portion of the door from the contents of the enclosure when the door is in said closed position, said deflector means including a deflector panel disposed within the enclosure and extending at an angle relative to said door when said door is in said closed position, one edge of the deflector panel being pivotally connected to the upper portion of the door, a second edge of the deflector panel being provided with slide means for supporting the deflector panel in sliding engagement with a portion of the guide means whereby the upper portion of the door is shielded from the contents of the enclosure when the door is in said closed position, the door and the deflector panel being freely movable relative to the access opening when the door is not closed.

14. A body according to claim 13, wherein the articulated door comprises a plurality of pivotally connected panels and said one edge of the deflector panel is pivotally connected to the uppermost panel of the door.

15. A body according to claim 13, further including false ceiling means spaced below the upper walls defining the enclosure and that portion of the guide means extending inwardly from the access opening, one end of the false ceiling means terminating at a position spaced from the plane of the access opening and the door when the door is in said closed position, the second edge of the deflector panel being disposed above and in close proximity to said one edge of the false ceiling means when the door is in said closed position.

16. A closure for a vehicle body access opening comprising an articulated door, means on the door for cooperative sliding engagement with door guide means provided adjacent a vehicle body access opening, a deflector panel having one edge pivotally connected to the upper portion of the door, slide means disposed upon a second edge of the deflector panel for supporting the deflector panel in sliding engagement with a guide means provided adjacent a vehicle body access opening whereby the upper portion of the articulated door is shielded from the contents of the vehicle body when the door is in a closed position and the door and deflector panel are freely movable relative to the access opening when the door is not closed, and false ceiling means for disposition within a vehicle body adjacent that portion of the guide means extending inwardly from the access opening and having one end thereof fabricated for termination at a position spaced from the plane of the access opening and the articulated door when the door is in closed position, the second edge of the deflector panel being constructed for disposition above and in close proximity to said one edge of the false ceiling means when the articulated door is in said closed position.

17. A closure according to claim 16, wherein the articulated door comprises a plurality of pivotally connected panels and said one edge of the deflector panel is pivotally connected to the uppermost panel of the door.

* * * * *

UNITED STATES PATENT OFFICE
CERTIFICATE OF CORRECTION

Patent No. 3,810,672            Dated May 14, 1974

Inventor(s) Flay D. Crosswell and Gerald W. Galbreath

It is certified that error appears in the above-identified patent and that said Letters Patent are hereby corrected as shown below:

In the Assignee's name, change "DOAR" to ---DOOR---.

Please add the following claim:

-19-

A vehicle body according to Claim 6, wherein said partition means is mounted for vertical swinging movement, and wherein said one edge of said partition means is disposed below the upper edge of said door when said door is in its closed vertical position.

Signed and sealed this 5th day of November 1974.

(SEAL)
Attest:

McCOY M. GIBSON JR.           C. MARSHALL DANN
Attesting Officer             Commissioner of Patents